March 18, 1969   W. O. TEETERS   3,433,508
PIPE COUPLING
Filed April 17, 1967
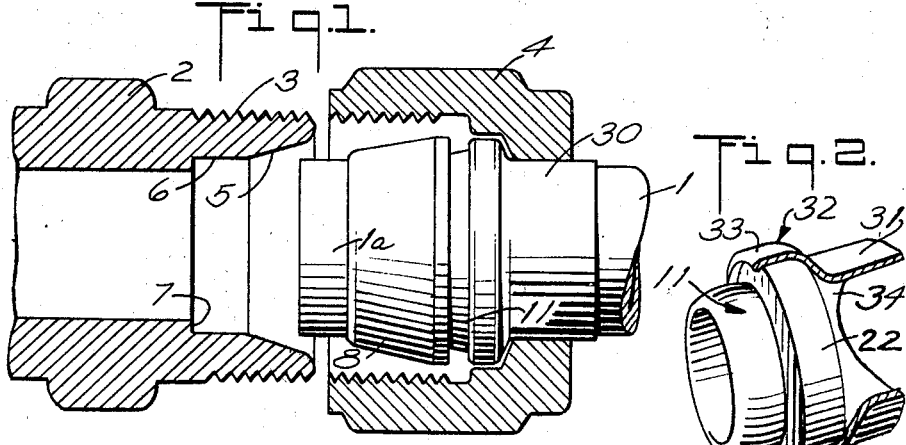
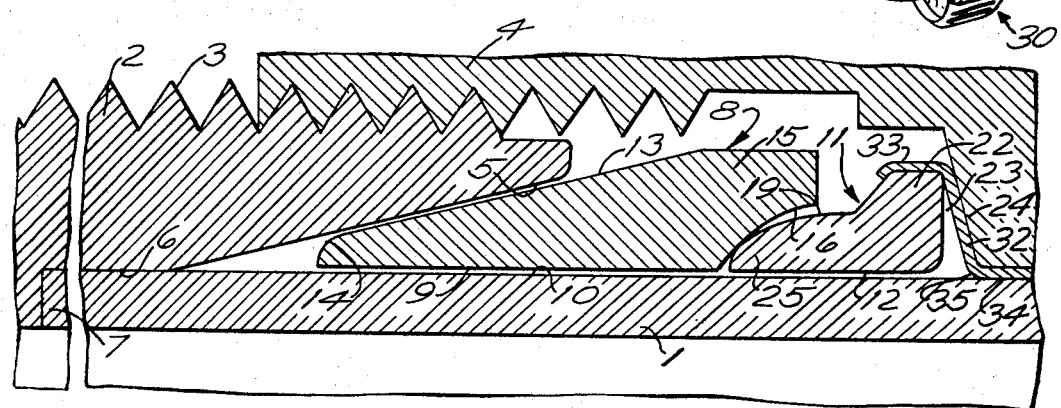
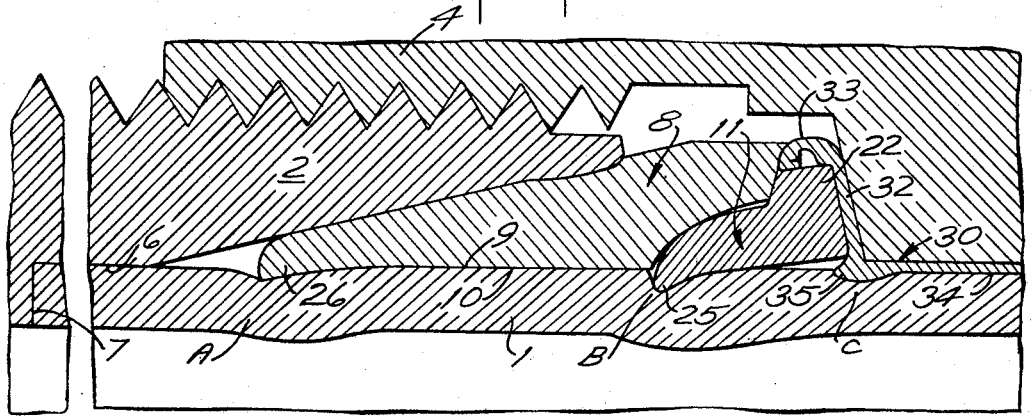
INVENTOR.
WILBUR O. TEETERS
BY
Norman M Holland
ATTORNEY United States Patent Office 3,433,508
Patented Mar. 18, 1969

3,433,508
PIPE COUPLING
Wilbur O. Teeters, Norwood, N.J., assignor to Hoke Manufacturing Company, Inc., Cresskill, N.J., a corporation of New Jersey
Filed Apr. 17, 1967, Ser. No. 631,298
U.S. Cl. 285—341                    4 Claims
Int. Cl. F16l 19/06, 19/08

ABSTRACT OF THE DISCLOSURE

A compression-type tube or pipe coupling having a front and a rear ferrule wherein a tail element is provided with a flared end which is lightly crimped over the rear portion of the rear ferrule and with a sleeve or shank portion extending about the pipe beyond the outer end of the coupling nut. As the nut is tightened the tail rotates as a bearing on the rear ferrule reducing the tendency of the ferrules to twist and gall the pipe. Further tightening causes the tail to be deformed causing its neck to grip the pipe behind the bite of the rear ferrule thereby reducing the destructive effects of vibration. The flared portion is also deformed about the rear portion of the rear ferrule preventing the ferrule from rolling excessively during extreme tightening of the nut. The crushed neck of the tail element also extends inwardly and acts as an adapter in compensating for various differences in the sizes of the pipes which may be coupled. The addition of this tail to the coupling also prevents the rear ferrule from being inadvertently reversed on the pipe when the fitting is being assembled.

Brief summary of invention

The present invention relates to a compression-type fitting or pipe coupling and more particularly to an improved compression-type coupling characterized by increased strength, reduced pipe galling, reduced vibration strain and mistake-proof assembly.

This invention is an improvement on compression couplings of the type shown in my U.S. Patent No. 3,215,457 which is assigned to the asignee of the present invention. Couplings of this type employ front and rear ring-like ferrules which are placed about the unthreaded and flareless end of a pipe. The pipe is coupled to a connecting member by a locking nut which moves the ferrules into locking and sealing relationship with the pipe under setting forces produced by the tightening of the locking nut on the threaded end portion of the connecting member. Camming surfaces on the interior of the nut and the connecting member provide a wedging action on the ferrules pressing them against the surface of the pipe to create a tight fluid seal.

The present invention comprises the provision of a sleeve-like tail element in this type of coupling. A flared end of the tail is crimped or otherwise attached onto the rear portion of the rear ferrule and its sleeve or shank portion extends about the pipe beyond the outer end of the coupling nut. This tail introduces a number of improvements in the coupling.

It has been found that the rear ferrule may be inadvertently reversed when assembling the coupling which causes the full effectiveness of the coupling to be reduced. By adding the tail this mistake is avoided as the correct position of the ferrule is obvious and as the coupling cannot be easily assembled if the connected ferrule and tail are not properly positioned.

Also, when assembling the prior coupling, as the nut engages the rear ferrule during tightening, a rotational force is impressed upon the ferrules which causes them to tend to gall and twist the pipe end. The provision of a separate element, the tail, fitted rotatably onto the rear ferrule creates a bearing, between the ferrule and the nut. The flared end of the tail element will rotate on the rear ferrule reducing the transmission of the objectionable rotational force from the nut and the resulting tendency to gall and twist the pipe end.

As the nut is further tightened it acts to crush the tail about the rear portion of the rear ferrule. The inner part of the tail at the flare presses in and grips the pipe behind the rear ferrule bite thereby providing a third gripping point on the pipe and further reducing vibrational effects which otherwise may damage the pipe at the coupling.

In addition to reducing the destructive effects of vibration a further advantage of this inward deformation or crushing of the tail is that this element acts as an adapter to modify the nut size so that smaller tubes such as those of metric sizes may be used with the same nut as a slightly larger decimal tube.

Another advantage is achieved by the deformation or crushing of the outer flange of the tail about the rear ferrule. In the event of excessive tightening of the clamping nut, the crushed portion of the tail acts between the inner surface of the nut and the upper rear surface of the rear ferrule to hold the rear ferrule against excessive rolling or penetration into the tube or pipe. This avoids continuous cutting of the tube by the ferrule which may cause cracking and break-off of the tube in the coupling.

Accordingly an object of the present invention is to provide an improvement of the coupling of Patent No. 3,215,457.

Another object of the present invention is to provide a compression-type pipe coupling which minimizes mistakes in assembly.

Another object of the present invention is to provide a compression-type pipe coupling which reduces galling and twisting of the pipe by the coupling ferrules.

A further object of the present invention is to provide a compression-type pipe coupling which acts to reduce the destructive effects due to vibration.

Another object of the present invention is to provide a compression-type pipe coupling which is adaptable to slight differences in pipe sizes and tolerances.

Another object of the present invention is to provide a compression-type pipe coupling which protects against excessive tightening of the coupling nut.

Other and further objects of the invention will be obvious upon an understanding of the illustrative embodiment about to be described, or will be indicated in the appended claims, and various advantages not referred to herein will occur to one skilled in the art upon employment of the invention in practice.

Brief description of the drawings

A preferred embodiment of the invention has been chosen for purposes of illustration and description and is shown in the accompanying drawings, forming a part of the specification, wherein:

FIG. 1 is a vertical sectional view illustrating a preferred embodiment of the coupling of the present invention loosely assembled;

FIG. 2 is an enlarged perspective view partly in section of the rear ferrule and tail element of the present invention;

FIG. 3 is an enlarged detailed sectional view of the coupling loosely assembled in a finger-tight relationship prior to the application of the setting torque; and FIG. 4 is an enlarged detailed sectional view similar to that shown in FIG. 3 illustrating the coupling in its final set position.

Detailed description

The coupling of this invention is adapted to couple a tube or pipe to a pipe connector, a valve or another element of a fluid system. For purposes of illustration, FIG. 1 shows a pipe 1 being connected to a threaded nipple 2. The nipple 2 is provided with a connecting portion including exterior threads 3 for engaging the internal threads of the nut 4 and a frusto-conical camming surface 5 which terminates in a counterbore 6 proportioned to receive the forward end of the pipe 1 which abuts shoulder 7. It is clear that the compression coupling of this invention may be used to connect the pipe 1 to any other element as long as the other element is provided with a connecting portion generally similar to that described above for the nipple 2.

The components of the coupling as shown in FIG. 1 include a front ferrule 8, a rear ferrule 11 and a tail element or sleeve 30, all of which are placed over the end 1a of the pipe 1 between the nipple 2 and the coupling nut 4. All of these components with the exception of the tail 30 may be essentially similar to those shown in the abovementioned Patent No. 3,215,457. The improvement which constitutes the present invention is the inclusion of the tail 30 in this type of coupling.

As best shown in FIG. 2 the tail element 30 comprises a cylindrical shank portion 31 and a flared forward portion 32. The end of the flared forward portion is in the form of a flange 33 and is lightly crimped or otherwise suitably attached about the enlarged rear portion 22 of the rear ferrule 11. The unitized member thus formed will avoid the possibility of the rear ferrule 11 being placed about the pipe 1 in a reverse orientation during assembly of the coupling. However, it should be understood that the tail 30 need not be fastened to the rear ferrule 11 in order to accomplish the other advantages to be gained through its use. Also, the rear ferrule 11 need not have an enlarged rear portion but may have various other suitable shapes.

The components of the coupling are shown in FIG. 3 in an enlarged section loosely assembled in a finger-tight relationship prior to the application of the setting torque. The coupling comprises the front sleeve or ferrule 8 of a generally ring-like shape with an inner surface 9 having a sliding fit with the outer surface 10 of the pipe 1. The rear ferrule 11 cooperates with the front ferrule 8 in the setting of the compression coupling. The rear ferrule 11 also has a generally ring-like shape with its inner surface 12 adapted for a sliding fit on the outer surface 10 of the pipe 1. The physical connection of the pipe 1 to the nipple 2 as well as the fluid seal between the nipple 2 and the pipe 1 is accomplished by the engagement of the ferrules 8 and 11 with the pipe 1, with the frusto-conical portion 5 of the nipple and with each other as the nut 4 is advanced on the threads 3 of the nipple.

When the coupling is loosely assembled in finger-tight relationship as illustrated in FIG. 3 the end of the pipe 1 abuts the shoulder 7 through the counterbored portion 6 of the nipple 2. The frusto-conical portion 5 of the nipple 2 is provided to give a wedging action with the inclined forward surface 13 of the front ferrule 8 to form a fluid seal between the nipple and the pipe when the ferrule 8 is driven forward as the coupling is set. In order to facilitate the initial contact between the front ferrule 8 and the frusto-conical portion 5, the corner 14 of the front ferrule 8 is rounded. The rear portion 15 of the front ferrule 8 is preferably a thickened and more rigid portion which has a generally rounded or sphero-concave guide portion 16 formed at its lower portion. This sphero-concave surface 16 cooperates with the rounded forward surface 19 of generally sphero-convex shape on the rear ferrule 11. This surface 19 preferably has a slightly sharper curvature than the rear surface 16 of the forward ferrule 8 which it abuts. The rear ferrule 11 has a somewhat enlarged rear portion 22 with a generally vertical camming surface 23. The flange portion 33 of the tail 30 fits over the outer annular surface of the rear portion 22 of the rear ferrule 11 and is slightly crimped at its end to hold it in position thereon. The flared surface 32 of the tail 30 is approximately parallel to the sloping camming surface 24 on the coupling nut 4. The shank portion 31 of the tail 30 with its inner surface 34 having a sliding fit with the outer surface 10 of the pipe 1 extends beyond the outer end of the coupling nut 4 as seen in FIG. 1.

The operation and the setting of the coupling will now be described. The general operation of the ferrules 8 and 11 in the prior art coupling will first be discussed and then the improved operation of the tail element 30 of the present invention included in the coupling will be described.

Advancement of the nut 4 on the threads 3 from the finger-tight position of FIG. 3 results in the following locking or coupling setting movement of the ferrules 8 and 11. The rear ferrule 11 is first forced tightly against the curved surface 16 of the forward ferrule 8. This simultaneously advances the forward ferrule 8 to a tight wedging relationship between the frusto-conical surface 5 of the nipple connection and the outer surface 10 of pipe 1 with the forward edge 26 biting into the pipe 1 at A. The rear ferrule 11 is caused to roll or gyrate in a counterclockwise direction due to the combined rotational forces generated by the curved surfaces 16 and 19 and the angularly aligned rear surface 23 of ferrule 11 and the inclined surface 24 of the nut 4. This rolling action of the rear ferrule 11 forces its forward edge 25 to bite into the pipe 1 at B as illustrated in FIG. 4 so that an extremely strong physical and fluid tight connection is formed between the pipe 1, the ferrules 8 and 11 and the nut 4. It has been found that this rolling action of the rear ferrule 11 provides a deep penetration of the edge 25 into pipe 1 with a relatively low torque being applied to the nut 4. A lesser penetration into the pipe 1 occurs at A by the forward edge 26 of the ferrule 8. With a coupling of the general proportion shown, the coupling is set with about one and one-quarter turns of nut 4 beyond the finger-tight position of FIG. 3.

An angle between the rear surface 23 of the ferrule 11 and the surface 24 of the nut 4 of about 15 degrees has been found to give good results. A sufficient rolling or gyration of the rear ferrule 11 has been found to be obtained where the angle between the surfaces 23 and 24 is reduced or eliminated as the abutting rounded surfaces 16 and 19 of the ferrules 8 and 11 provide also for the roll or gyration. In this case, however, a slightly higher setting torque is required.

The imposition of the improved tail member 30 of the present invention in a coupling of this type offers many advantages which will now be discussed in connection with the setting operation whose results are shown in FIG. 4. However, it should be understood that the improved tail member 30 is adaptable to use in other types of couplings with equivalent advantage.

As previously stated, when the coupling nut 4 is initially tightened in the absence of the tail element 30, its inclined surface 24 engages the rear ferrule 11 and imparts a rotational force to this ferrule and through it to the front ferrule 8. The action of this force on the ferrules may cause them to tend to gall and twist the pipe end 1a. With the imposition of the tail element 30 between the inclined surface 24 of the nut 4 and the rear portion 22 of the rear ferrule 11 this condition is alleviated. The flared portion 32 of the tail 30 in this intermediate position acts as a bearing between the rotating nut 4 and the stationary rear ferrule 11. The tail 30 will first be contacted by the inclined surface 24 of the nut 4 and will rotate with respect to the rear portion 22 of the rear ferrule 11. The flange 33 is only lightly crimped on the rear ferrule 11 in a preferred embodiment so as to permit this relative rotation.

As the nut 4 is rotated further it acts to compress and crush the tail 30 about the rear portion 22 of the rear ferrule 11. This action of the advancing inclined surface 24 of the nut 4 causes the inner part of the neck 35 of the tail 30 at the flare 32 to press in and grip the surface 10 of the pipe 1. As the nut 4 continues to advance the tail 30 is crushed about the rear surface 23 of the rear ferrule 11 and initiates the biting action of the two ferrules 8 and 11 on the forward surface of the pipe 1 at A and B. The neck portion 35 of the tail 30 is further crushed during this action and provides a third gripping point C on the pipe along with those of the two ferrules. This triple-grip feature provides increased strength in the joint and further reduction of the destructive effects of the vibrations in the pipe coupling.

In addition to reducing the vibrational effects another advantage of this inward crushing of the tail 30 is that the tail element also acts as an adapter to modify the nut size. Smaller diameter tubes such as those of metric sizes may be used with the same nut as the slightly larger decimal tubes since the crushed tail 30 will fill the gap and appropriately grip the available tube.

As the nut 41 is tightened further the two ferrules 8 and 11 are pressed together and roll slightly, as previously described, gripping the surface 10 of the pipe 1. This compression of the ferrules crushes the outer flange portion 33 of the tail 30 at the outer annular surface of the rear portion 22 of the rear ferrule 11. The rear surface of the front ferrule 8 presses against the forward or crimped edge of the tail flange 33 and tends to crush and deform it. This is of advantage in the event of excessive tightening of the nut 4. This crushed end portion 33 of the tail 30 acts to prevent excessive rolling of the ferrules in the joint, which rolling can cause continuous cutting of the tube at A and B toward its axis by the ferrules. Such cutting may cause cracking and breaking off of the tube in the coupling.

The crushing of the tail flange 33 not only acts to hold the ferrules against excessive rolling when the nut is extremely tightened but also offers a safety factor in such event. In this type of coupling the nut may be easily turned during the initial tightening until the ferrules have bitten into the pipe surface. At the point where the nut is properly tightened the reaction to the tightening force will noticeably increase. If the tightening operation continues somewhat beyond this point damaging effects may occur. In the present arrangement, however, the resilient material of the tail element 30 will be crushed during this initial excessive tightening for a period which is sufficient to warn the one tightening the nut to cease the tightening force before any damage occurs.

It will also be seen from the compactness of the coupling and the extension of the sleeve or shank portion 31 of the tail 30 along the surface of the pipe beyond the outer end of the clamping nut 4 that any tendency of the pipe to bow at the coupling will be overcome.

The improved couplings when thus set have been found to have an extremely high static strength. This strength may be conveniently termed a static efficiency ratio which is expressed as a ratio of the static pull-out force in pounds required to destroy the coupling to the setting force in foot-pounds required to rotate the setting nut 4 to its fully set position. Such efficiency ratio values have been measured for this coupling including the tail element and they have been consistently found to be higher than 60 to 1 and normally as high as 100 to 1. Such ratios are as much as 30% greater than those found in testing other compression couplings.

Another important feature which has been observed in the above described coupling is its ability to be repeatedly reused so that the fluid systems using these connectors may be dismantled and reassembled as often as desired without any reduction in the sealing ability and the coupling strength provided.

The coupling may be made of any of the various metals and plastic materials used for piping and related fittings such as brass, iron, and steel including the stainless varieties. In general, the coupling material corresponds to the material used for the pipes being connected.

It will thus be seen that an improved compression-type coupling has been provided which by the addition of a tail element offers increased strength, reduced vibrational effects, reduced tendency to deform the pipe end, mistake-proof assembly and various other advantages as above indicated.

This improved coupling is obtained with relatively simple fittings adapted for easy application and capable of being manufactured by routine and high speed shaping operations. The coupling is also adapted for being dismantled and reused as many times as desired without any loss of its sealing efficiency.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a tube coupling of the type including a body having a cylindrical tube receiving bore, a coupling nut threadedly engaging the body, a front ferrule and a rear ferrule encircling and slidably engaging the tube between the body and the nut, the improvement comprising a tail member with a radially enlarged end having an axially extending flange portion engaging the rear portion of the rear ferrule, a sleeve portion which encircles and slidably engages the tube, and a flared portion connecting said flange and sleeve portions and spaced from said rear ferrule whereby the application of torque to the coupling nut applies a rotational and compressional force on the flared portion of the tail member causing an inner part of the flared portion to be pressed inwardly against the tube and into the bore of the rear ferrule and an outer portion to bearingly abut the rear portion of the rear ferrule and the flange portion of the tail member to abut the front ferrule.

2. The tube coupling as claimed in claim 1 wherein the flange portion of the radially enlarged end of the tail member slidingly engages the rear portion of the rear ferrule.

3. The tube coupling as claimed in claim 1 wherein the coupling nut is provided with an internal camming surface which is substantially parallel to the flared portion of the radially enlarged end of the tail member.

4. A tube coupling comprising a body having a cylindrical tube receiving bore with an outwardly flared end portion, a front ferrule having a cylindrical center bore for encircling and slidably engaging the tube, the front outer surface of said front ferrule flaring outwardly at a lesser flare than the flared end portion of said bore, the rear portion of said front ferrule having a radially outwardly extending thickened flange portion, the front ferrule terminating at its rear end in a outwardly flaring concave surface having an arcuate shape in a longitudinal radial plane, a rear ferrule having a cylindrical center bore for encircling and slidably engaging the tube, the rear ferrule having its front portion convexly shaped with an arcuate shape in cross section, the concave surface of the front ferrule engaging the convex front portion of the rear ferrule, the arcuate shape of the convex portion of the rear ferrule being formed by a smaller radius than the radius forming the arcuate shape of the concave surface of the front ferrule, the rear half of said rear ferrule comprising a radially thickened portion, a coupling nut threadedly engaging said body, said coupling nut having a forwardly facing inner surface flared with respect to the back portion of the rear ferrule, and a tail member having a sleeve portion encircling and slidably engaging the tube and an enlarged portion with a flange portion which encircles and slidably engages the thickened portion of the rear ferrule and a flared portion intermediate said flange and sleeve portions of said tail member and parallel to said inner surface of said coupling nut, all portions of said sleeve being of substantially the same thickness whereby torquing of the coupling nut deforms the tail member and the ferrules to grip the tube.

References Cited

UNITED STATES PATENTS

| | | | |
|---|---|---|---|
| 2,232,513 | 2/1941 | Confer | 285—341 X |
| 2,349,180 | 5/1944 | Lamont | 285—341 X |
| 2,394,351 | 2/1946 | Wurzburger | 285—341 X |
| 2,484,815 | 10/1949 | Crawford | 285—382.7 X |
| 2,536,354 | 1/1951 | Cowles | 285—342 X |
| 3,215,457 | 11/1965 | Teeters | 285—341 |

FOREIGN PATENTS

| | | |
|---|---|---|
| 1,359,315 | 3/1964 | France. |
| 1,066,065 | 9/1959 | Germany. |

THOMAS F. CALLAGHAN, *Primary Examiner.*

U.S. Cl. X.R.

285—382.7